US010494960B2

United States Patent
Roberts et al.

(10) Patent No.: US 10,494,960 B2
(45) Date of Patent: Dec. 3, 2019

(54) ENGINE VALVE LIFTER

(71) Applicant: Eaton Corporation, Cleveland, OH (US)

(72) Inventors: Leighton Roberts, Kalamazoo, MI (US); Keith Eugene Kropf, Tulsa, OK (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 16/010,753

(22) Filed: Jun. 18, 2018

(65) Prior Publication Data
US 2018/0291771 A1  Oct. 11, 2018

Related U.S. Application Data

(63) Continuation of application No. PCT/US2016/067541, filed on Dec. 19, 2016.
(Continued)

(51) Int. Cl.
*F01M 9/10* (2006.01)
*F01L 1/14* (2006.01)
(Continued)

(52) U.S. Cl.
CPC .............. *F01L 1/146* (2013.01); *B23C 3/30* (2013.01); *F01L 1/245* (2013.01); *F01M 9/104* (2013.01);
(Continued)

(58) Field of Classification Search
CPC ......... F01L 2001/2427; F01L 2001/256; F01L 1/46; F01L 2103/00; F01L 2105/00;
(Continued)

(56) References Cited

U.S. PATENT DOCUMENTS 3,664,312 A * 5/1972 Miller, Jr. ................. F01L 1/22
                                                        123/90.19
3,886,808 A * 6/1975 Weber ....................... F01L 1/14
                                                        74/569
(Continued)

FOREIGN PATENT DOCUMENTS

WO    2015106051 A1    7/2015
WO  WO-2015106051 A1 *  7/2015  .............. F01L 1/146

OTHER PUBLICATIONS

International Search Report and Written Opinion for International Application No. PCT/US2016/067541 dated Apr. 11 2017, 11 pages.

*Primary Examiner* — Jorge L Leon, Jr.
(74) *Attorney, Agent, or Firm* — RMCK Law Group PLC

(57) ABSTRACT

An engine roller lifter for use in a valve train of an internal combustion engine according to one example of the present disclosure includes a body and a groove formed in the body. The body has an outer peripheral surface configured for sliding movement in a bore provided in the engine. The bore is supplied by an oil passage communicating therewith. The body defines an axial pocket that receives a plunger therein. The groove is inset from the outer peripheral surface and formed about only a portion of a circumference of the body. The groove defines a first end and a second end. Only a portion of the first and second ends overlap with the oil passage to regulate the amount of oil supplied to the groove from the oil passage.

15 Claims, 9 Drawing Sheets

Related U.S. Application Data

(60) Provisional application No. 62/269,636, filed on Dec. 18, 2015.

(51) Int. Cl.
  *B23C 3/30* (2006.01)
  *F01L 1/245* (2006.01)

(52) U.S. Cl.
  CPC ..... *F01L 2001/256* (2013.01); *F01L 2103/00* (2013.01); *F01L 2105/00* (2013.01); *F01L 2107/00* (2013.01); *F01L 2810/02* (2013.01); *F16N 2270/22* (2013.01)

(58) Field of Classification Search
  CPC .. F01L 2107/00; F01L 2810/02; F01M 9/104; F16N 2270/22; B23C 3/34
  USPC .............................................. 123/90.35, 90.5
  See application file for complete search history.

(56) References Cited

U.S. PATENT DOCUMENTS

| | | | | |
|---|---|---|---|---|
| 4,607,599 | A | * | 8/1986 | Buente .................... F01L 1/255 123/90.48 |
| 5,127,374 | A | * | 7/1992 | Morel, Jr. ................. F01L 1/14 123/90.35 |
| 5,975,038 | A | * | 11/1999 | Fischer .................... F01L 1/25 123/90.55 |
| 2006/0027193 | A1 | | 2/2006 | Sailer et al. |

* cited by examiner

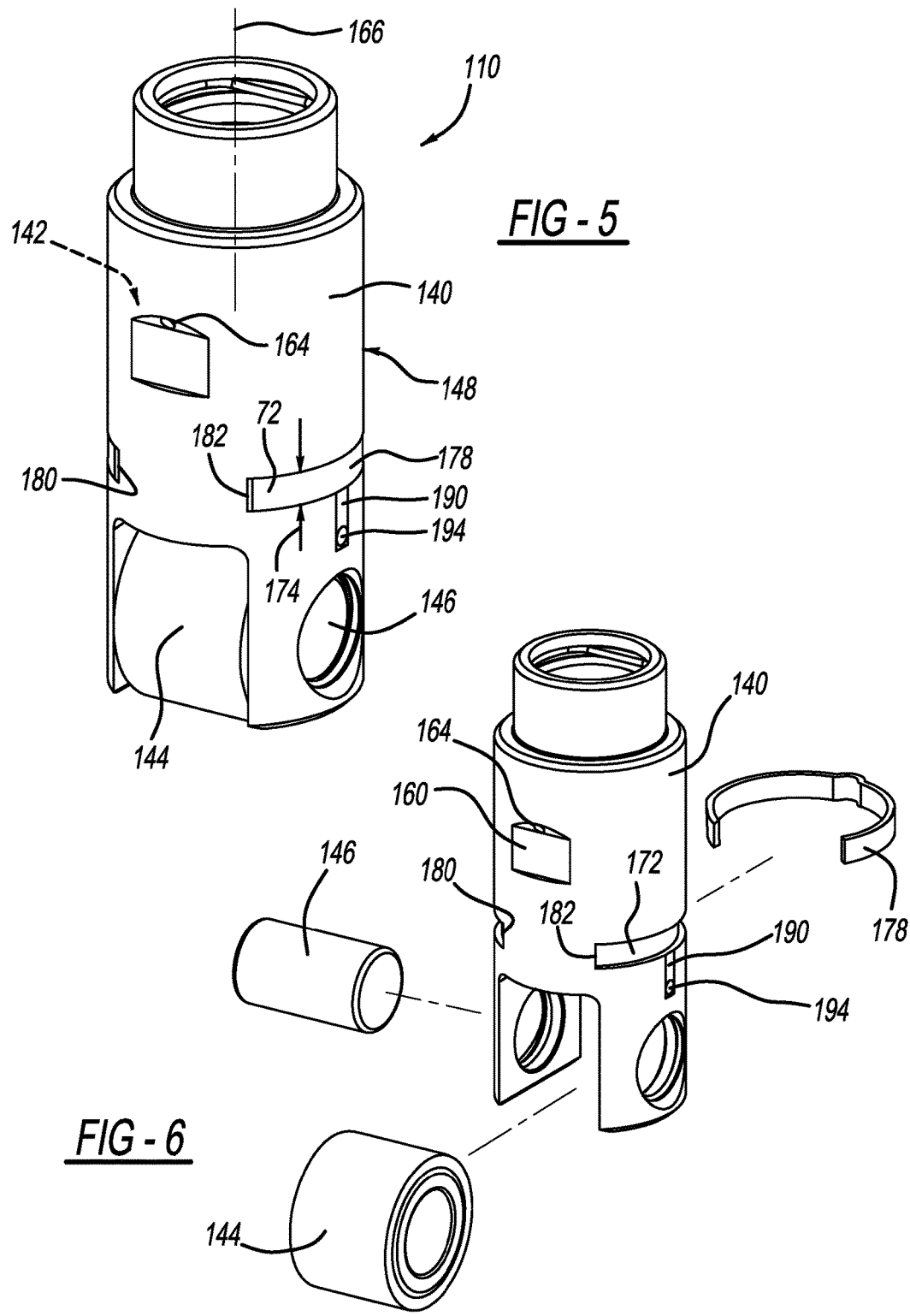

ENGINE VALVE LIFTER

CROSS-REFERENCE TO RELATED APPLICATIONS

This application is a continuation of International Application No. PCT/US2016/067541 filed Dec. 19, 2016, which claims the benefit of U.S. Patent Application No. 62/269,636 filed on Dec. 18, 2015. The disclosures of the above applications are incorporated herein by reference.

FIELD

The present disclosure relates to hydraulic lash adjusting tappets of the type having a roller follower for contacting a cam shaft in an internal combustion engine valve train.

BACKGROUND

Roller lifters can be used in an engine valvetrain to reduce friction and as a result provide increased fuel economy. In other advantages, a roller lifter can open a valve quicker and for a longer period of time than a flat tappet lifter. In this regard, airflow can be attained quicker and longer, thereby increasing the ability to create power. It can be challenging to efficiently manage lubrication around the roller lifter.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An engine roller lifter for use in a valve train of an internal combustion engine according to one example of the present disclosure includes a body and a groove formed in the body. The body has an outer peripheral surface configured for sliding movement in a bore provided in the engine. The bore is supplied by an oil passage communicating therewith. The body defines an axial pocket that receives a plunger therein. The groove is inset from the outer peripheral surface and formed about only a portion of a circumference of the body. The groove defines a first end and a second end. Only a portion of the first and second ends overlap with the oil passage to regulate the amount of oil supplied to the groove from the oil passage.

According to additional features, the roller lifter further comprises a roller bearing rotatably mounted to the body and configured for rolling contact with an engine camshaft. The body comprises a transverse passage and a connecting channel formed in the body that is inset from the outer peripheral surface. The connecting channel fluidly connects the groove and the transverse passage. Oil received at the groove from the bore flows along the connecting channel into the transverse passage and onto the roller bearing. An anti-rotation ring is received at the groove. Oil received at the groove from the bore flows around the anti-rotation ring. The portions of the first and second ends that overlap define oil entry windows that fluidly connect the bore and the oil passage. In one example the groove ends are rounded. In another example the groove ends are square. The oil entry windows are defined by transverse first and second groove ends and a radial profile of the oil passage.

A method of manufacturing an engine roller lifter for use in a valve train of an internal combustion engine includes providing a body and forming a groove in the body. The body has an outer peripheral surface configured for sliding movement in a bore provided in the engine. The bore is supplied by an oil passage communicating therewith. The body defines an axial pocket that receives a plunger therein. The groove is formed in the body inset from the outer peripheral surface. The groove is formed about only a portion of a circumference of the body and defines first and second ends. Only a portion of the first and second ends are configured to overlap with the oil passage to regulate the amount of oil supplied to the groove from the oil passage.

According to other features, forming the groove comprises forming a milled cut with a milling bit. In another example, forming the groove comprises forming a milled cut with a milling saw blade. Forming the groove can include forming a groove having rounded ends. In another example, forming the groove comprises forming a groove having square ends. A transverse passage and a connecting channel can be formed in the body. The connecting channel is inset from the outer surface. The connecting channel fluidly connects the groove and the transverse passage. Oil received at the groove from the bore flows along the connecting channel into the transverse passage and onto a roller bearing. In other examples, the desired volume of oil to flow into the bore provided in the engine is determined. The groove is formed based on the determination.

BRIEF DESCRIPTION OF THE DRAWINGS

The present disclosure will become more fully understood from the detailed description and the accompanying drawings, wherein:

FIG. 5 is a perspective view of a roller lifter constructed in accordance to additional features;

FIG. 6 is an exploded view of the roller lifter of FIG. 5;

DETAILED DESCRIPTION

Figure 1:
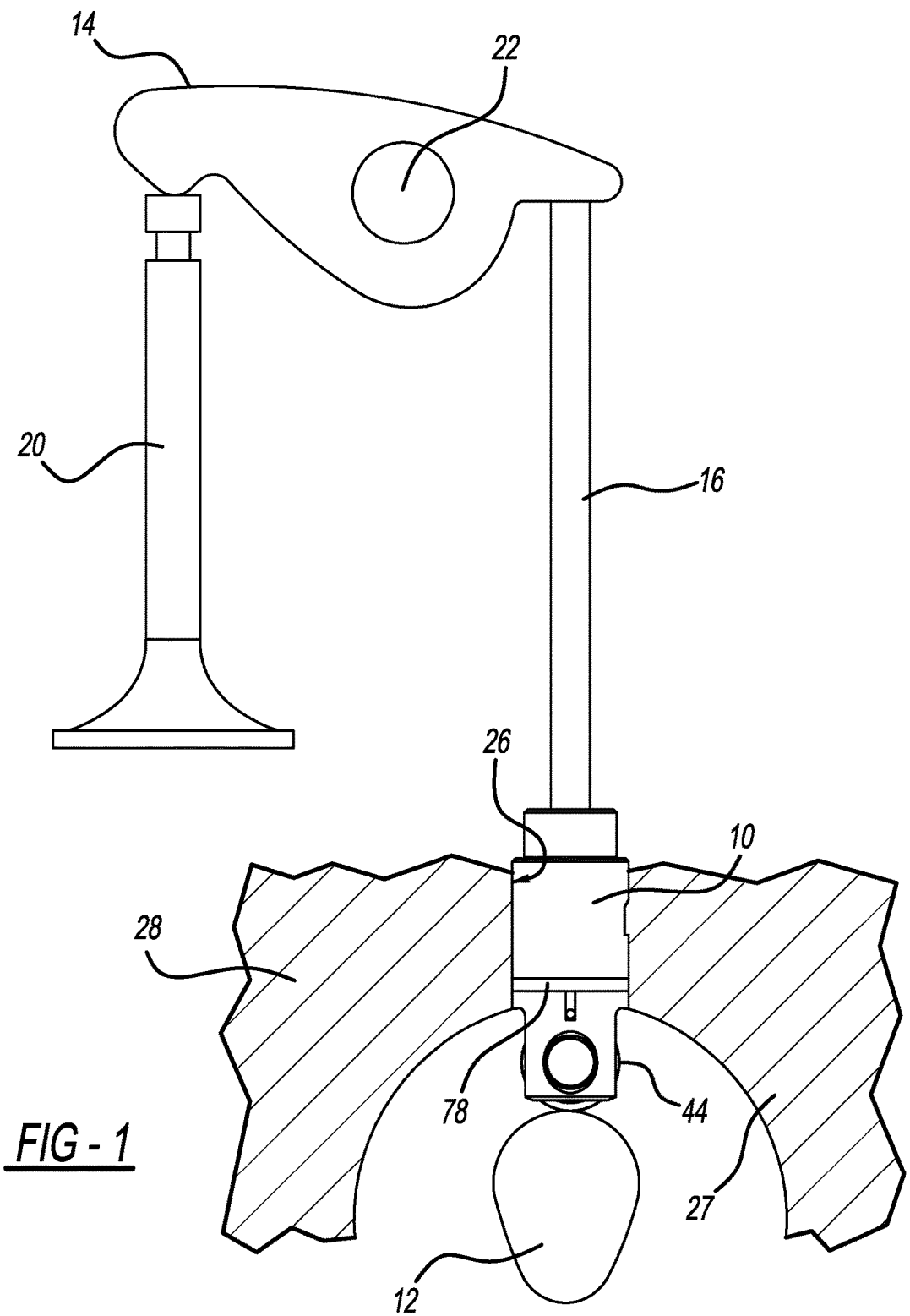
FIG. 1 is a roller lifter constructed in accordance with one example of the present disclosure and shown in an exemplary Type V valve train arrangement.

With initial reference to FIG. 1, a roller lifter constructed in accordance to one example of the present disclosure is shown and generally identified at reference 10. The roller lifter 10 is shown as part of a Type V arrangement. It will be appreciated that while the roller lifter 10 is shown in a Type V arrangement, the roller lifter 10 may be used in other arrangements within the scope of the present disclosure. In this regard, the features described herein associated with the roller lifter 10 can be suitable to a wide variety of applica-"

tions. A cam lobe 12 indirectly drives a first end of a rocker arm 14 with a push rod 16. It will be appreciated that in some configurations, such as an overhead cam, the roller lifter 10 may be a direct link between the cam lobe 12 and the rocker arm 14. A second end of the rocker arm 14 actuates a valve 20. As the cam lobe 12 rotates, the rocker arm 14 pivots about a fixed shaft 22. The roller lifter 10 is in contact with, and follows the cam 12 through a conventional roller bearing or roller follower 24, such as a needle roller bearing type. Those skilled in the art will appreciate that the present disclosure is not limited to any particular roller follower design, or for example, whether the axle of the roller is provided with a needle bearing or merely a bushing.

With continued reference to FIG. 1 and additional reference to FIG. 4, additional environmental features will be described. The roller lifter 10 is configured to reciprocate along its axis within a lifter-receiving bore 26 formed in a cylinder head 27 of an engine block 28. An oil supply gallery 30 provides high-pressure oil through an oil gallery passage 32 to the lifter-receiving bore 26. As will become appreciated herein, the design of the roller lifter 10 can determine the amount of oil that comes into contact with the roller lifter 10 based on its exposure to the oil gallery passage 32.

With additional reference now to FIGS. 2-4, the roller lifter 10 will be described in greater detail. The roller lifter 10 generally includes a body 40, a leakdown assembly 42 received within the body 40, and a roller bearing 44 rotatably mounted to the body 40 by an axle 46. The body 40 includes an outer peripheral surface 48 configured for sliding movement in the bore 26 provided in the cylinder head 27 of the engine block 28 (FIG. 1).

The body 40 can define an axial pocket 49 that receives the leakdown assembly 42, which can include a plunger 50, a check ball 52, a first biasing member 54, a cage 56, and a second biasing member 58. An inset 60 can be provided in the body 40 at the outer peripheral surface 48. An oil inlet channel 64 can be defined in the body 40 to fluidly connect the inset 60 with the axial pocket 49. The oil inlet channel 64 can be configured to communicate oil between the outer peripheral surface 48 and the plunger 50 of the leakdown assembly 42.

The body 40 can define a longitudinal axis 66. An anti-rotation ring or clip 78 is nestingly received in a corresponding groove 72 formed on the body 40 for capturing the axle 46 of the roller bearing 44 in the roller lifter 10. As identified above, the roller bearing 44 can be configured for rolling contact with the engine camshaft 12. The groove 72 has a groove width 74 (FIG. 2) and a groove depth 76 (FIG. 4).

Figure 2:
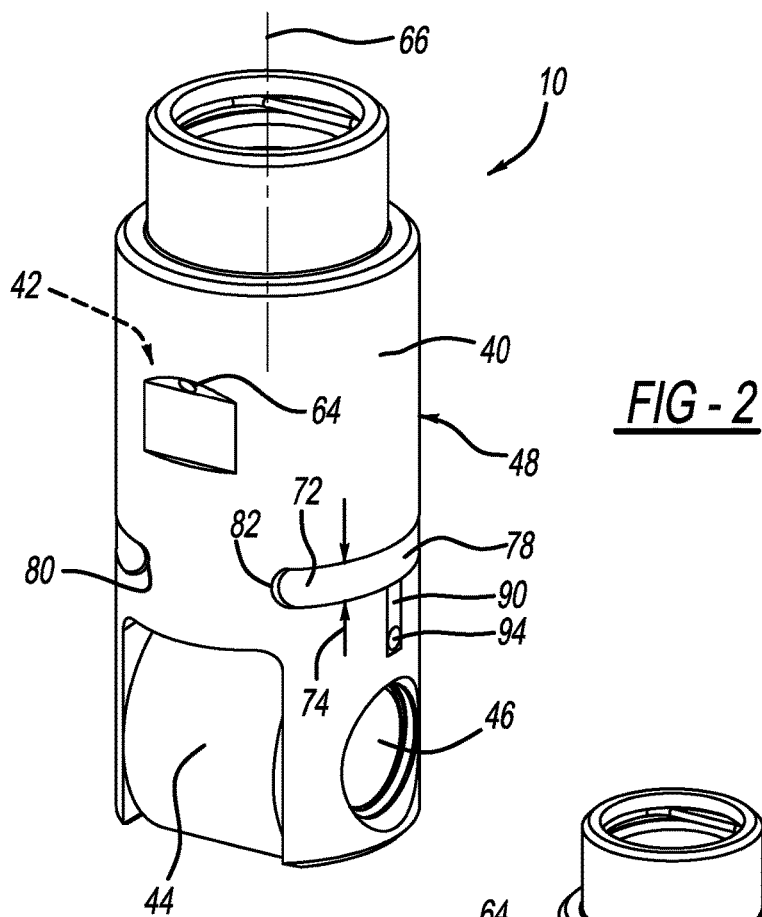
FIG. 2 is a perspective view of the roller lifter of FIG. 1.
Figure 3:
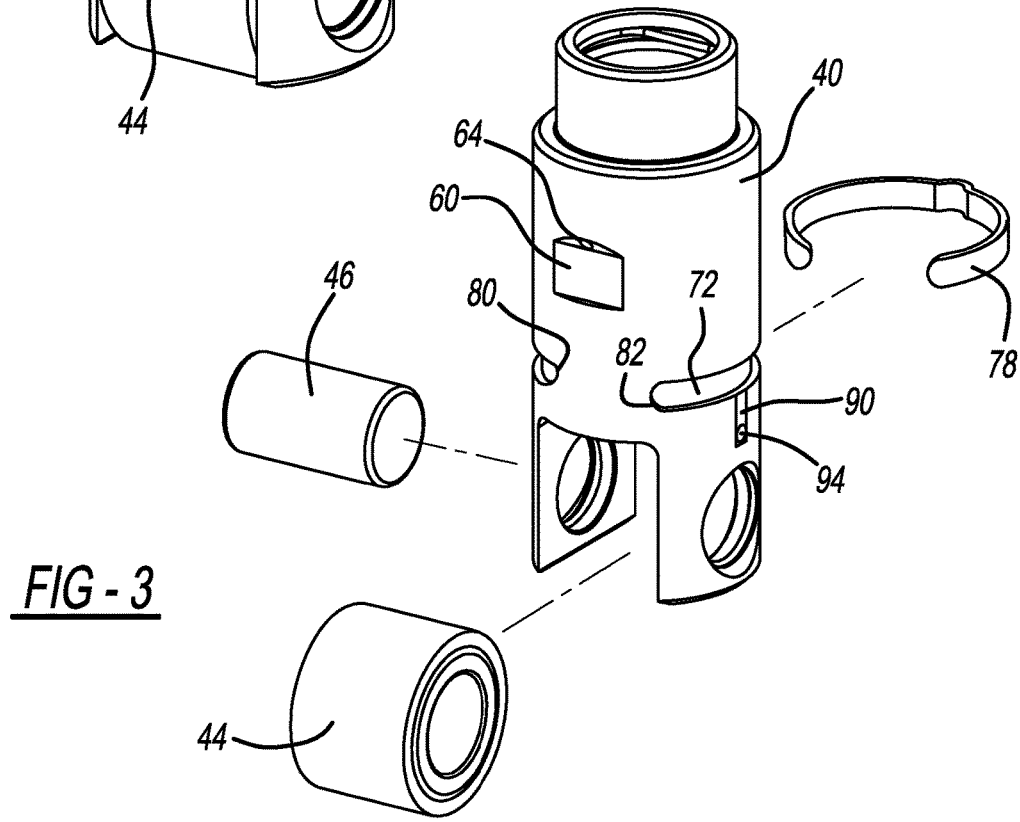
FIG. 3 is an exploded view of the roller lifter of FIG. 2.

As shown in FIG. 2, the groove 72 includes a first end 80 and a second end 82. As such, the groove 72 does not extend about the entire circumference of the outer peripheral surface 48. In one example, groove 72 can extend and is oriented orthogonal to or generally orthogonal to the longitudinal axis 66. As shown in FIG. 4, the first and second ends 80 and 82 can be formed at a predetermined position to define oil entry windows 84 and 86. The oil entry windows 84 and 86 determine how much of the first and second ends 80 and 82 of the groove 72 extend and overlap into communication with the oil gallery passage 32 (FIG. 3). The oil entry windows 84 and 86 therefore can introduce oil into the groove 72 around the clip 78.

Figure 4:
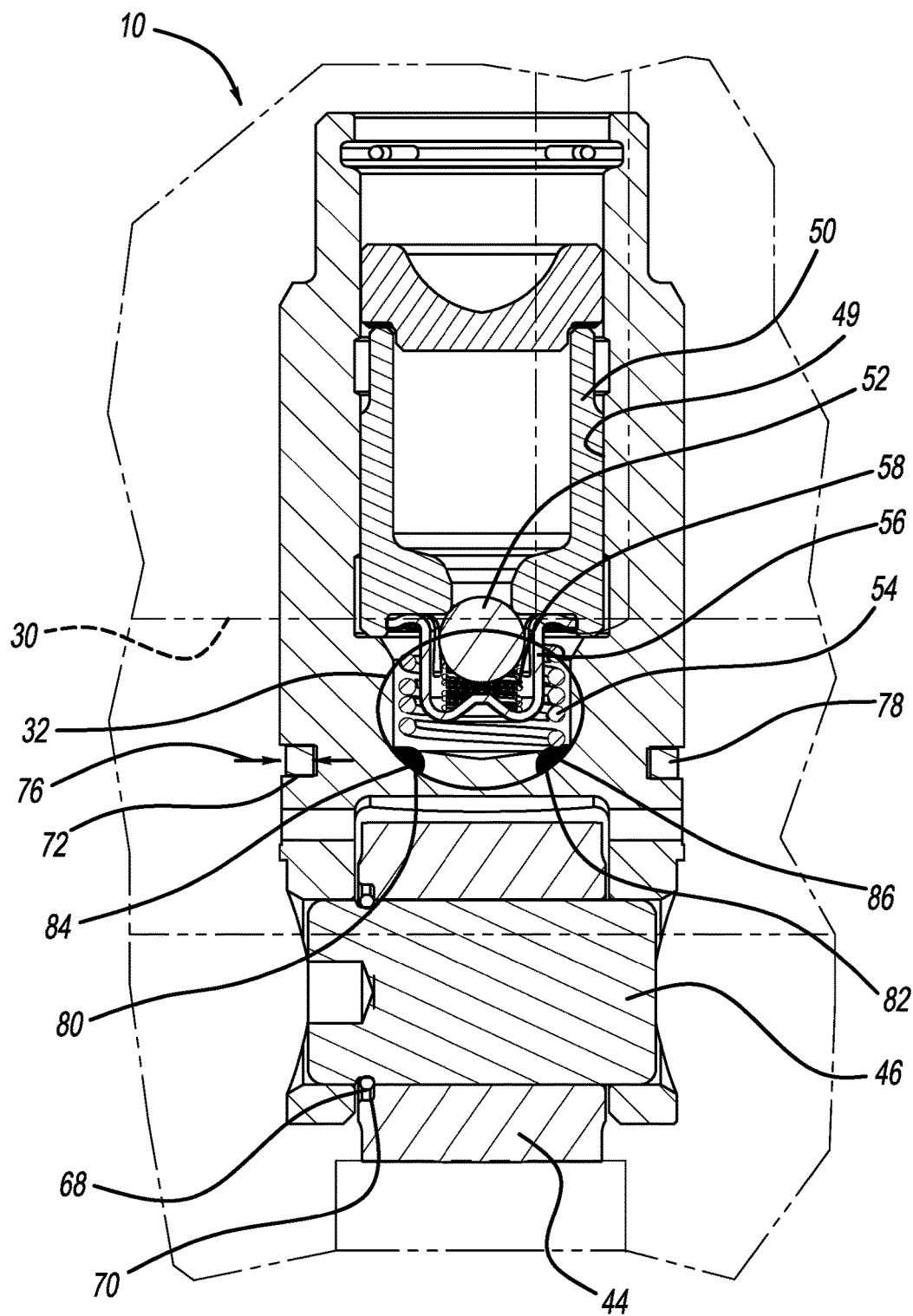
FIG. 4 is a sectional view of the roller lifter and shown disposed in an engine block.

As shown in FIG. 4, the oil entry window 84 of the first groove end 80 overlaps with the oil gallery passage 32 connected with the oil supply gallery 30 to receive oil therefrom. Similarly, the oil entry window 86 of the second groove end 82 overlaps with the oil gallery passage 32 connected with the oil supply gallery 30 to receive oil therefrom. The area of the oil entry windows 84 and 86 may be predefined to control the amount of oil supplied from the oil gallery passage 32 to the groove 72. As such, because the first and second ends 80 and 82 can overlap only a portion of the oil gallery passage 32 (as opposed to ends 80 and 82 connecting and extending across the whole passage 32), the amount of oil released into the groove 72 is limited. This can limit a drop in oil pressure, which can prevent a drop in lubrication to other parts of the engine such as the main bearing.

In one example, the groove 72 is formed using a milling bit to make a milled cut of the groove 72. In this example, the first and second groove ends 80 and 82 may be rounded or generally rounded as shown in FIGS. 1 and 2. The milled cut allows the first and second groove ends 80 and 82 to be formed at predetermined locations, which enables control of the amount of oil flowing into the groove 72 from the oil gallery passage 32. As such, varying the location of the first and second groove ends 80 and 82 of the cut in the body 40 allows regulation of the amount of oil released to the groove 72.

With further reference to FIG. 2, the body 40 can include a connecting channel 90 formed therein. The connecting channel 90 can be inset a connecting channel depth from the outer peripheral surface 48. In one example the connecting channel depth is less than the groove depth 76. The connecting channel 90 fluidly connects the groove 72 with a transverse passage 94.

During operation, oil received at the groove 72 from the oil gallery passage 32 (FIG. 4) defined in the cylinder head 27 of the engine block 28 flows around the groove 72, along (down) the connecting channel 90, into the transverse passage 94 and onto the roller bearing 44. The groove 72 is therefore dual-purpose allowing for receipt of the anti-rotation clip 78 and providing an oil pathway to communicate oil to the roller bearing 44. Furthermore, because the groove 72 includes groove ends 82 and 84 that define windows 84 and 86 that overlap with oil gallery passage 32, a controlled and predefined amount of oil is supplied to the groove 72, thereby reducing oil loss due to an uncontrolled, high pressure oil flow.

Moreover, because the connecting channel 90 is inset or recessed into the outer peripheral surface 48 of the body 40, a predetermined amount of oil is permitted to flow from the groove 72 to the transverse passage 94. In the example shown, the connecting channel depth is minimal so as to control the rate of oil flow to a predetermined value. In one configuration, the connecting channel 90 can extend along an axis that is parallel to the longitudinal axis 66.

With additional reference now to FIGS. 5-7, a roller lifter 110 constructed in accordance to additional features will be described. The roller lifter 110 generally includes a body 140, a leakdown assembly 142 received within the body 140, and a roller bearing 144 rotatably mounted to the body 140 by an axle 146. The body 140 includes an outer peripheral surface 148 configured for sliding movement in the bore 26 provided in the cylinder head 27 of the internal combustion engine 28 (FIG. 1).

The body 140 can define an axial pocket 149 that receives the leakdown assembly 142, which can include a plunger 150, a check ball 152, a first biasing member 154, a cage 156, and a second biasing member 158. An inset 160 can be provided in the body 140 at the outer peripheral surface 148. An oil inlet channel 164 can be defined in the body 140 to fluidly connect the inset 160 with the axial pocket 149. The oil inlet channel 164 can be configured to communicate oil between the outer peripheral surface 148 and the plunger 150 of the leakdown assembly 142.

The body 140 can define a longitudinal axis 166. An anti-rotation ring or clip 178 is nestingly received in a corresponding groove 172 formed on the body 140 for capturing the axle 146 of the roller bearing 144 in the roller lifter 110. As identified above, the roller bearing 144 can be configured for rolling contact with the engine camshaft 12. The groove 172 has a groove width 174 (FIG. 5) and a groove depth 176 (FIG. 7).

As shown in FIG. 5, the groove 172 includes a first end 180 and a second end 182. As such, the groove 172 does not extend about the entire circumference of the outer peripheral surface 148. In one example, groove 172 can extend and is oriented orthogonal to or generally orthogonal to the longitudinal axis 166. As shown in FIG. 7, the first and second ends 180 and 182 can be formed at a predetermined position to define oil entry windows 184 and 186. The oil entry windows 184 and 186 determine how much of the first and second ends 180 and 182 of the groove 172 extend and overlap into communication with the oil gallery passage 32 (FIG. 3). The oil entry windows 184 and 186 therefore can introduce oil into the groove 172 around the clip 178.

Figure 7:
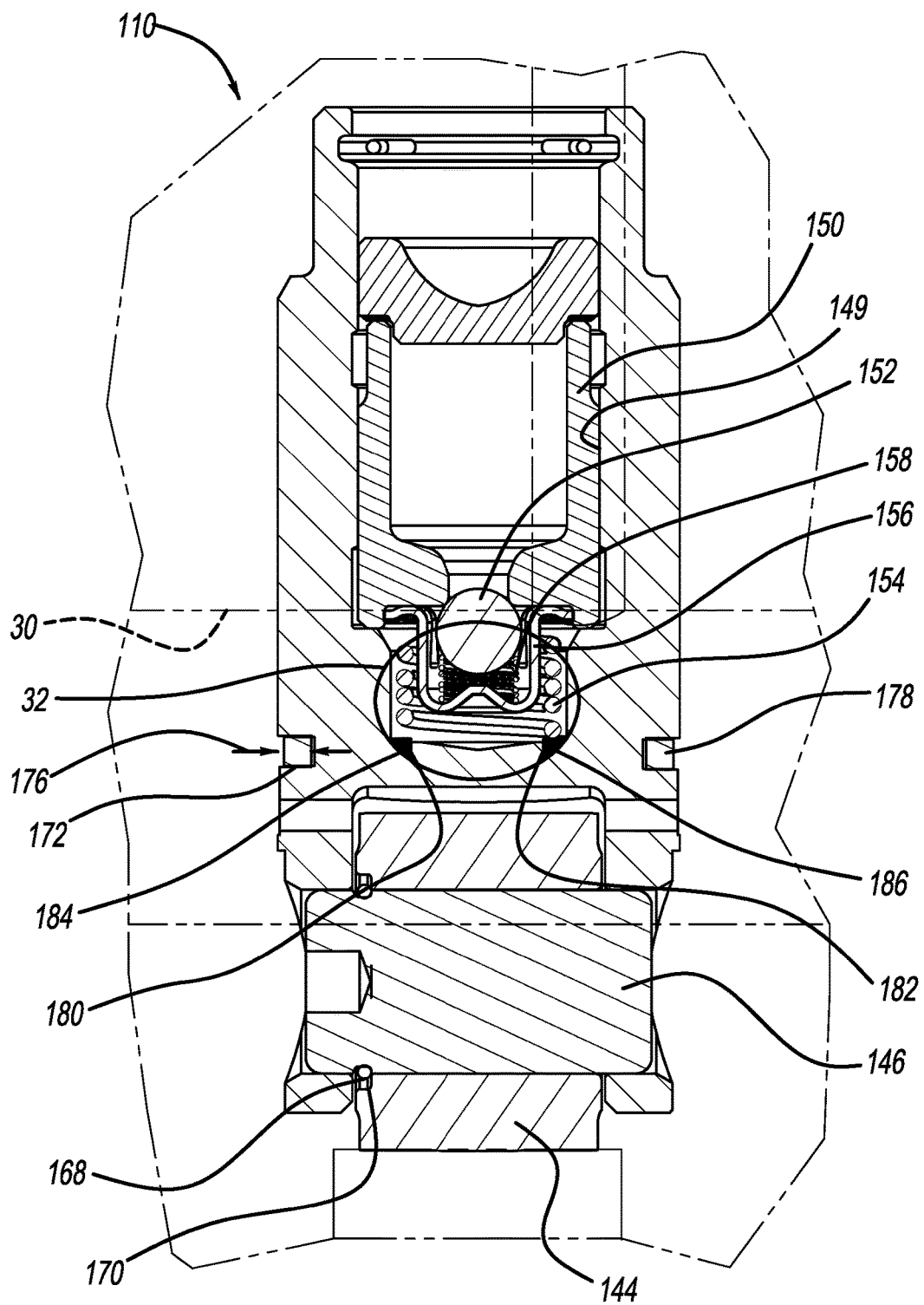
FIG. 7 is a sectional view of the roller lifter of FIG. 5 and shown disposed in an engine block.

As shown in FIG. 7, the oil entry window 184 of the groove first end 180 overlaps with the oil passage 32 connected with the oil gallery 30 to receive oil therefrom. Similarly, the oil entry window 186 of the groove second end 182 overlaps with the oil gallery passage 32 connected with the oil gallery 30 to receive oil therefrom. The area of the oil entry windows 184 and 186 may be predefined to control the amount of oil supplied from the oil passage 32 to the groove 172. As such, because the first and second ends 180 and 182 can overlap only a portion of the oil gallery passage 32 (as opposed to ends 180 and 182 connecting and extending across the whole passage 32), the amount of oil released into the groove 172 is limited. This can limit a drop in oil pressure, which can prevent a drop in lubrication to other parts of the engine such as the main bearing.

In one example, the groove 172 is formed using a milling bit to make a milled cut of the groove 172. In this example, the first and second ends 180 and 182 may be squared or have flat transverse ends. The milled cut allows the first and second groove ends 180 and 182 to be formed at predetermined locations, which enables control of the amount of oil flowing into the groove 172 from the oil gallery passage 132. As such, varying the location of the ends 180 and 182 of the cut in the body 140 allows regulation of the amount of oil released to the groove 172.

With further reference to FIG. 5, the body 140 can include a connecting channel 190 formed therein. The connecting channel 190 can be inset a connecting channel depth from the outer peripheral surface 148. In one example the connecting channel depth is less than the groove depth 176. The connecting channel 190 fluidly connects the groove 172 with a transverse passage 194.

During operation, oil received at the groove 172 from the oil gallery passage 32 (FIG. 4) defined in the cylinder head 27 of the engine block 28 flows around the groove 172, along (down) the connecting channel 190, into the transverse passage 194 and onto the roller bearing 144. The groove 172 is therefore dual-purpose allowing for receipt of the anti-rotation clip 178 and providing an oil pathway to communicate oil to the roller bearing 144. Furthermore, because the groove 172 includes groove ends 182 and 184 that define windows 184 and 186 that overlap with oil gallery passage 32, a controlled and predefined amount of oil is supplied to the groove 172, thereby reducing oil loss due to an uncontrolled, high pressure oil flow.

Moreover, because the connecting channel 190 is inset or recessed into the outer peripheral surface 148 of the body 140, a predetermined amount of oil is permitted to flow from the groove 172 to the transverse passage 194. In the example shown, the connecting channel depth is minimal so as to control the rate of oil flow to a predetermined value. In one configuration, the connecting channel 190 can extend along an axis that is parallel to the longitudinal axis 166.

With additional reference now to FIGS. 8-10, a roller lifter 210 constructed in accordance to additional features will be described. The roller lifter 210 generally includes a body 240, a leakdown assembly 242 received within the body 240, and a roller bearing 244 rotatably mounted to the body 240 by an axle 246. The body 240 includes an outer peripheral surface 248 configured for sliding movement in the bore 26 provided in the cylinder head 27 of the engine block 28 (FIG. 1).

The body 240 can define an axial pocket 249 that receives the leakdown assembly 242, which can include a plunger 250, a check ball 252, a first biasing member 254, a cage 256, and a second biasing member 258. An inset 260 can be provided in the body 240 at the outer peripheral surface 248. An oil inlet channel 264 can be defined in the body 240 to fluidly connect the inset 260 with the axial pocket 249. The oil inlet channel 264 can be configured to communicate oil between the outer peripheral surface 248 and the plunger 250 of the leakdown assembly 242.

The body 240 can define a longitudinal axis 266. An anti-rotation ring or clip 278 is nestingly received in a corresponding groove 272 formed on the body 240 for capturing the axle 246 of the roller bearing 244 in the roller lifter 210. As identified above, the roller bearing 244 can be configured for rolling contact with the engine camshaft 12. The groove 272 has a groove width 274 (FIG. 8) and a groove depth 276 (FIG. 10).

Figure 10:
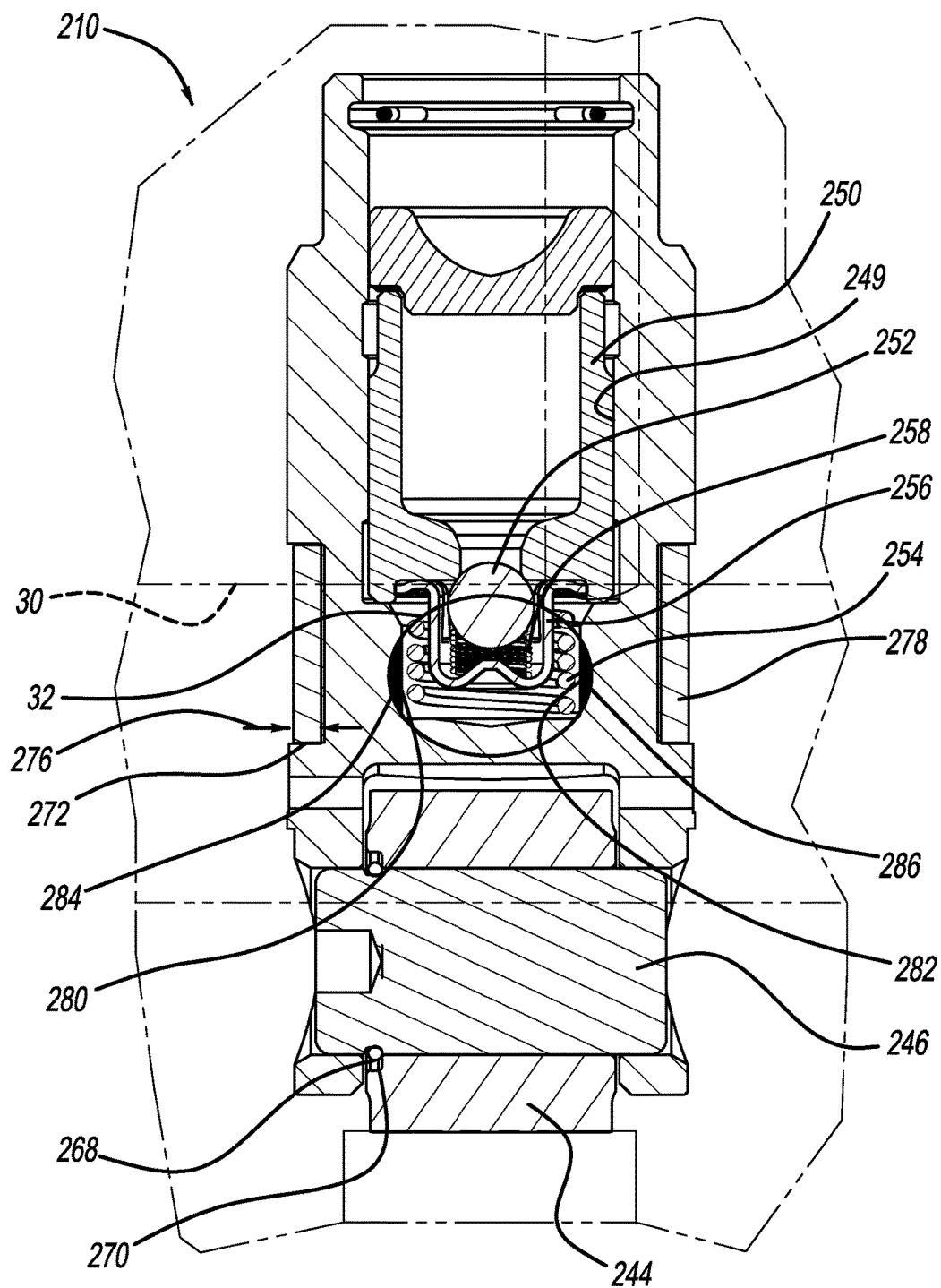
FIG. 10 is a sectional view of the roller lifter of FIG. 8 and shown disposed in an engine block.

As shown in FIG. 10, the groove 272 includes a first groove end 280 and a second groove end 282. As such, the groove 272 does not extend about the entire circumference of the outer peripheral surface 248. In one example, groove 272 can extend and is oriented orthogonal to or generally orthogonal to the longitudinal axis 266. As shown in FIG. 10, the first and second groove ends 280 and 282 can be formed at a predetermined position to define oil entry windows 284 and 286. The oil entry windows 284 and 286 determine how much of the first and second groove ends 280 and 282 of the groove 272 extend and overlap into communication with the oil gallery passage 32 (FIG. 3). The oil entry windows 284 and 286 therefore can introduce oil into the groove 272 around the clip 278.

The oil entry window 284 of the first groove end 280 overlaps with the oil passage 32 connected with the oil supply gallery 30 to receive oil therefrom. Similarly, the oil entry window 286 of the second groove end 282 overlaps with the oil gallery passage 32 connected with the oil supply gallery 30 to receive oil therefrom. The area of the oil entry windows 284 and 286 may be predefined to control the amount of oil supplied from the oil gallery passage 32 to the groove 272. As such, because the first and second groove ends 280 and 282 can overlap only a portion of the oil gallery passage 32 (as opposed to groove ends 280 and 282 connecting and extending across the whole passage 32), the amount of oil released into the groove 272 is limited. This can limit a drop in oil pressure, which can prevent a drop in lubrication to other parts of the engine such as the main bearing.

In one example, the groove 272 is formed using a milling bit to make a milled cut of the groove 272. In this example, the first and second groove ends 280 and 282 may be squared or have flat transverse ends. The oil entry windows 284 and 286 can generally be defined by the transverse groove end 280 and 282 and the radial profile of the oil gallery passage 232. The milled cut allows the first and second groove ends 280 and 282 to be formed at predetermined locations, which enables control of the amount of oil flowing into the groove 272 from the oil gallery passage 232. As such, varying the location of the groove ends 280 and 282 of the cut in the body 240 allows regulation of the amount of oil released to the groove 272.

Figure 8:
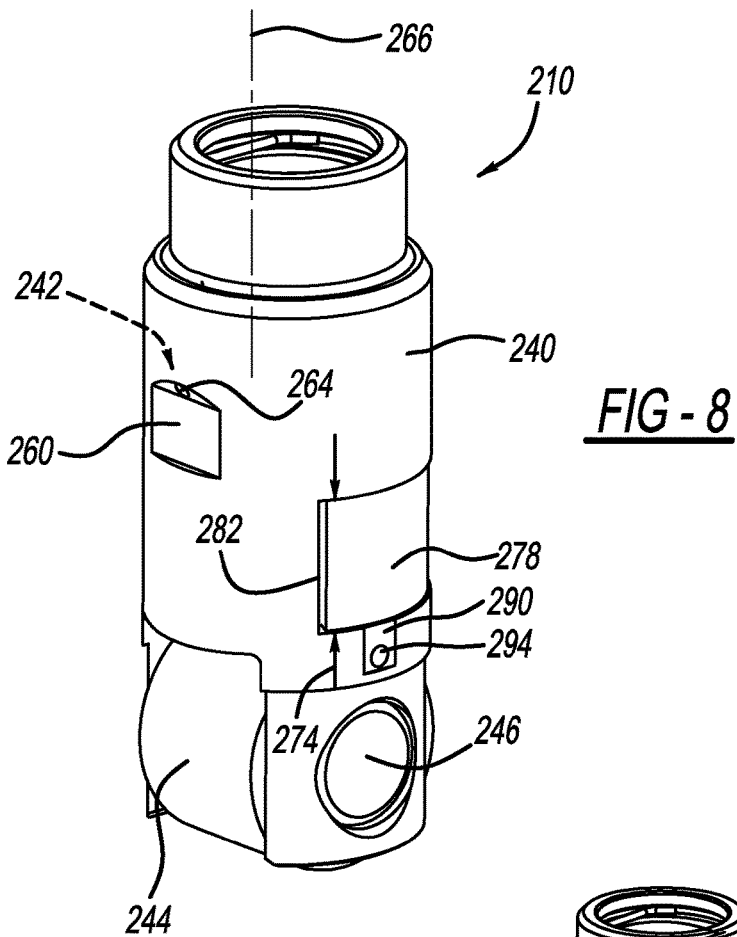
FIG. 8 is a perspective view of a roller lifter constructed in accordance to additional features.
Figure 9:
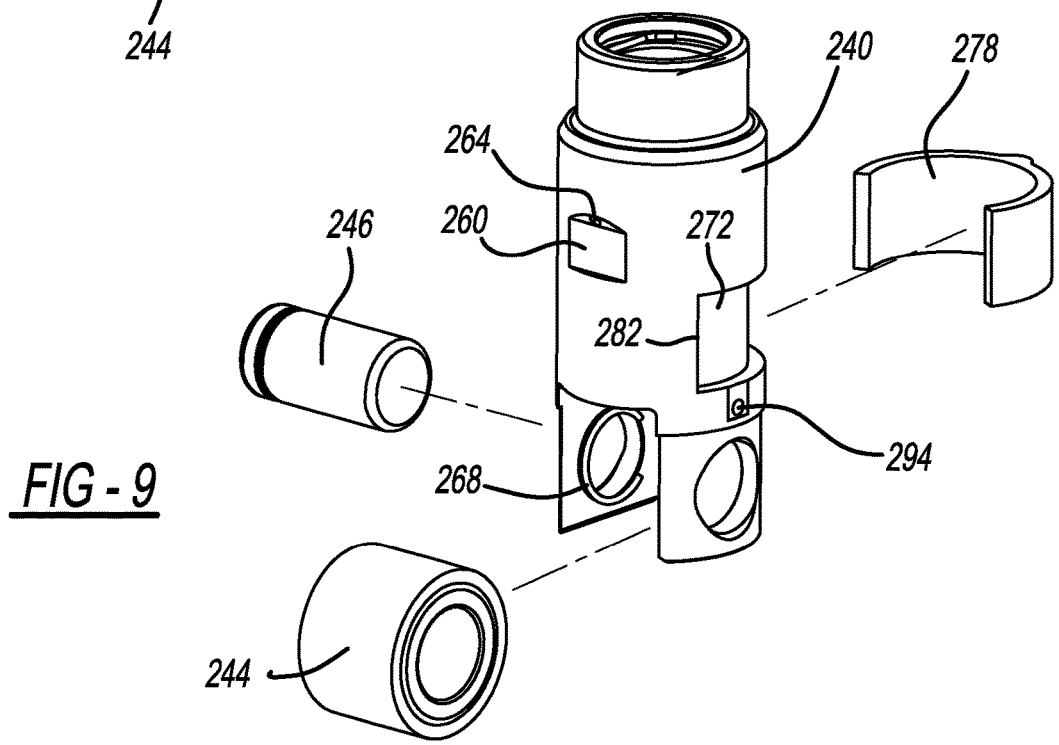
FIG. 9 is an exploded view of the roller lifter of FIG. 8.

With further reference to FIG. 8, the body 240 can include a connecting channel 290 formed therein. The connecting channel 290 can be inset a connecting channel depth from the outer peripheral surface 248. In one example the connecting channel depth is less than the groove depth 276. The connecting channel 290 fluidly connects the groove 272 with a transverse passage 294.

During operation, oil received at the groove 272 from the oil gallery passage 32 (FIG. 4) defined in the cylinder head 27 of the engine block 28 flows around the groove 272, along (down) the connecting channel 290, into the transverse passage 294 and onto the roller bearing 244. The groove 272 is therefore dual-purpose allowing for receipt of the anti-rotation clip 278 and providing an oil pathway to communicate oil to the roller bearing 244. Furthermore, because the groove 272 includes groove ends 282 and 284 that define windows 284 and 286 that overlap with oil gallery passage 32, a controlled and predefined amount of oil is supplied to the groove 272, thereby reducing oil loss due to an uncontrolled, high pressure oil flow.

Moreover, because the connecting channel 290 is inset or recessed into the outer peripheral surface 248 of the body 240, a predetermined amount of oil is permitted to flow from the groove 272 to the transverse passage 294. In the example shown, the connecting channel depth is minimal so as to control the rate of oil flow to a predetermined value. In one configuration, the connecting channel 290 can extend along an axis that is parallel to the longitudinal axis 266.

With additional reference now to FIGS. 11 and 12, a roller lifter 310 constructed in accordance to additional features will be described. The roller lifter 310 generally includes a body 340, a leakdown assembly 342 received within the body 340, and a roller bearing 344 rotatably mounted to the body 340 by an axle 346. The body 340 includes an outer peripheral surface 348 configured for sliding movement in the bore 26 provided in the cylinder head 27 of the internal combustion engine 28 (FIG. 1).

The body 340 can define an axial pocket 349 that receives the leakdown assembly 342, which can include a plunger 350, a check ball 352, a first biasing member 354, a cage 356, and a second biasing member 358. An inset 360 can be provided in the body 340 at the outer peripheral surface 348. An oil inlet channel 364 can be defined in the body 340 to fluidly connect the inset 360 with the axial pocket 349. The oil inlet channel 364 can be configured to communicate oil between the outer peripheral surface 348 and the plunger 350 of the leakdown assembly 342.

The body 340 can define a longitudinal axis 366. An anti-rotation ring or clip 378 is nestingly received in a corresponding groove 372 formed on the body 340 for capturing the axle 346 of the roller bearing 344 in the roller lifter 310. As identified above, the roller bearing 344 can be configured for rolling contact with the engine camshaft 12.

Figure 11:
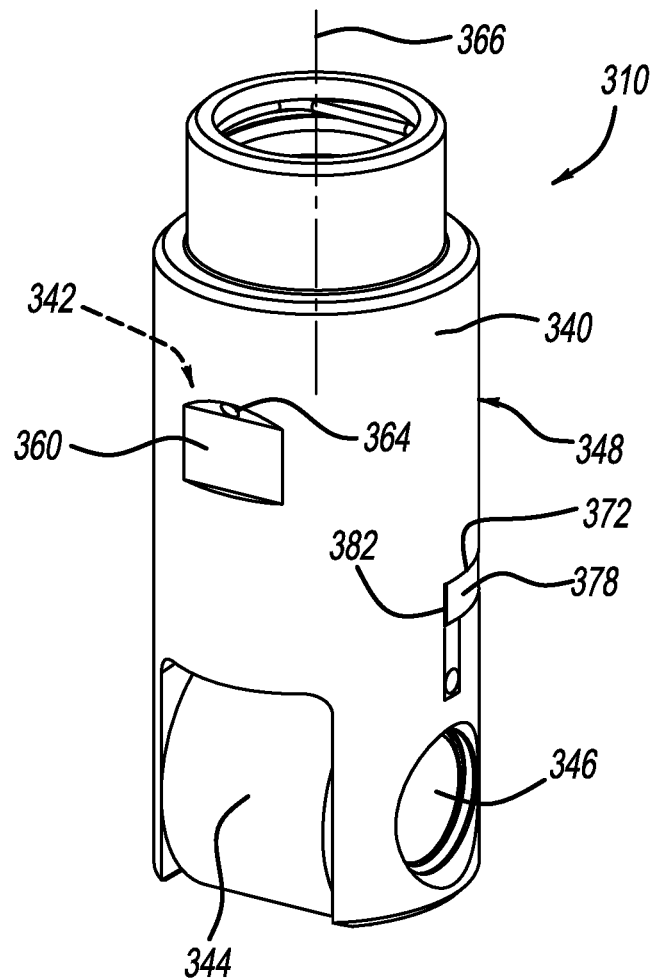
FIG. 11 is a perspective view of a roller lifter constructed in accordance to additional features.
Figure 12:
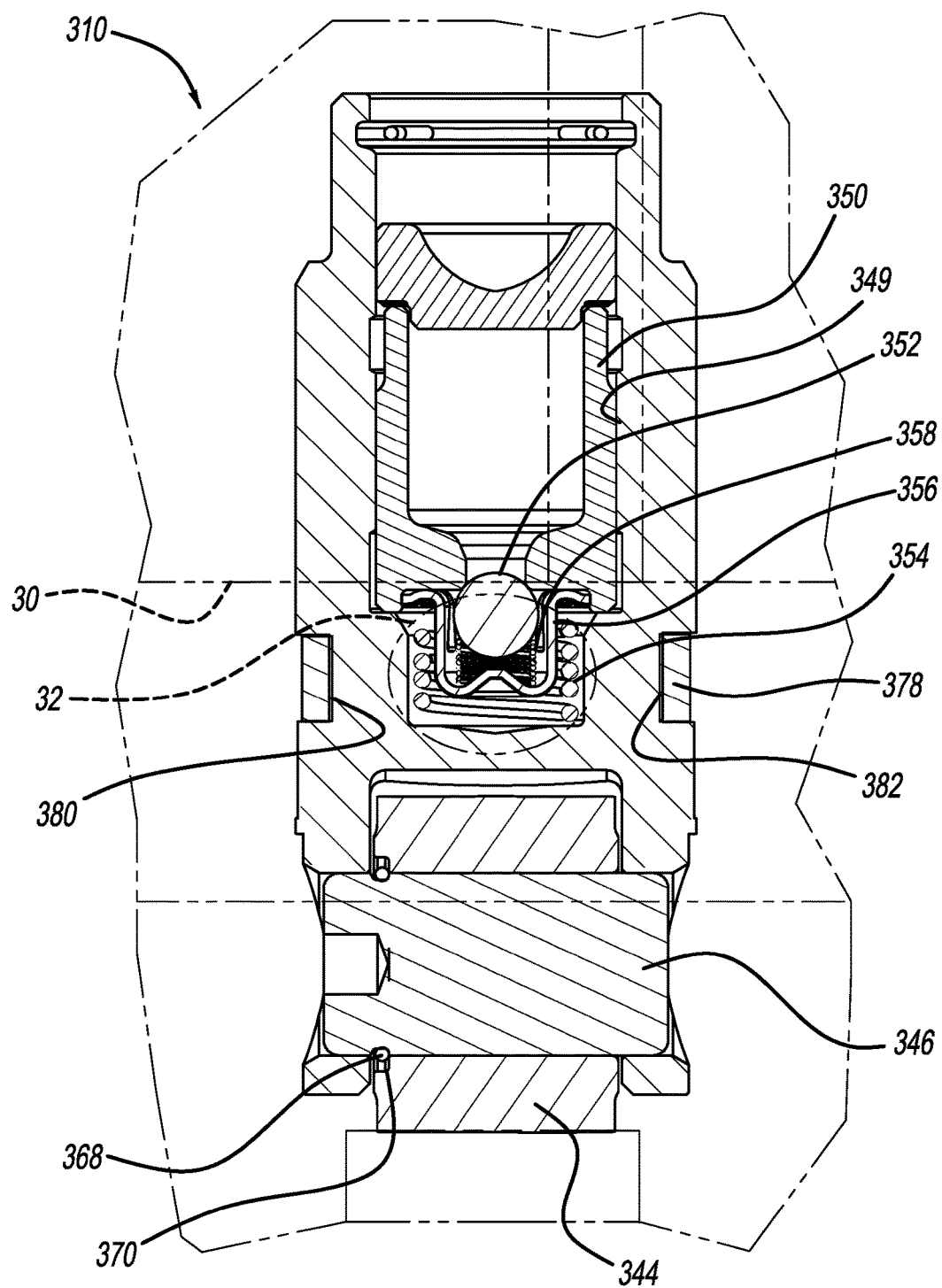
FIG. 12 is a sectional view of the roller lifter of FIG. 11 and shown disposed in an engine block.

As shown in FIG. 11, the groove 372 includes a first end 380 and a second end 382. As such, the groove 372 does not extend about the entire circumference of the outer peripheral surface 348. In one example, groove 372 can extend and is oriented orthogonal to or generally orthogonal to the longitudinal axis 366. As shown in FIG. 12, the first and second ends 380 and 382 can be formed at a predetermined position so as not to define oil entry windows as provided by the examples above. In this regard, oil is not provided a direct access area into the groove 372. In some examples, it may not be desirable to provide such direct access. Instead, sufficient oil may flow around the body 340 from the oil gallery passage 32.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. An engine roller lifter for use in a valve train of an internal combustion engine, the engine roller lifter comprising:
    a body having an outer peripheral surface configured for sliding movement in a bore provided in the engine, the bore supplied by an oil passage, the body defining an axial pocket that receives a plunger; and
    a partial circumferential groove formed in the body and inset from the outer peripheral surface, the groove defining a first groove end and a second groove end, wherein a portion of the first groove end and a portion of the second groove end define a first oil entry window and a second oil entry window, respectively;
    wherein the oil passage overlaps with the groove at the first and second oil entry windows so as to regulate an amount of oil supplied to the groove from the oil passage.

2. The engine roller lifter of claim 1, further comprising a roller bearing rotatably mounted to the body and configured for rolling contact with an engine camshaft.

3. The engine roller lifter of claim 2, wherein the body further comprises:
    a transverse passage; and
    a connecting channel formed in the body and inset from the outer peripheral surface, the connecting channel fluidly connecting the groove and the transverse passage, wherein oil received at the groove from the bore flows along the connecting channel, into the transverse passage and onto the roller bearing.

4. The engine roller lifter of claim 1, further comprising an anti-rotation ring received at the groove, wherein oil received at the groove from the bore flows around the anti-rotation ring.

5. The engine roller lifter of claim 1 wherein the first and second oil entry windows fluidly connect the bore and the oil passage.

6. The engine roller lifter of claim 5 wherein the first and second groove ends are rounded.

7. The engine roller lifter of claim 5 wherein the first and second groove ends are square.

8. The engine roller lifter of claim 7 wherein the oil entry windows are defined by the first and second groove ends and a radial profile of the oil passage.

9. A method of manufacturing an engine roller lifter for use in a valve train of an internal combustion engine, the method comprising:
   providing a body having an outer peripheral surface configured for sliding movement in a bore provided in the engine, the bore supplied by an oil passage, the body defining an axial pocket that receives a plunger; and
   forming a partial circumferential groove in the body inset from the outer peripheral surface, the groove defining a first groove end and a second groove end, wherein a portion of the first groove end and a portion of the second groove end define a first oil entry window and a second oil entry window, respectively;
   wherein the oil passage overlaps with the groove at the first and second oil entry windows so as to regulate an amount of oil supplied to the groove from the oil passage.

10. The method of claim 9, wherein forming the groove comprises forming a milled cut with a milling bit.

11. The method of claim 9, wherein forming the groove comprises forming a milled cut with a milling saw blade.

12. The method of claim 9 wherein the first and second groove ends are rounded.

13. The method of claim 9 wherein the first and second groove ends are square.

14. The method of claim 9, further comprising forming a transverse passage and a connecting channel in the body that is inset from the outer peripheral surface, the connecting channel fluidly connecting the groove and the transverse passage, wherein oil received at the groove from the bore flows along the connecting channel, into the transverse passage and onto a roller bearing.

15. The method of claim 9, further comprising:
   forming the groove based on a target threshold volume of oil to flow into the bore provided in the engine.

* * * * *